March 26, 1935.  L. L. WICKLAND  1,995,761
VISOR
Filed Feb. 27, 1932
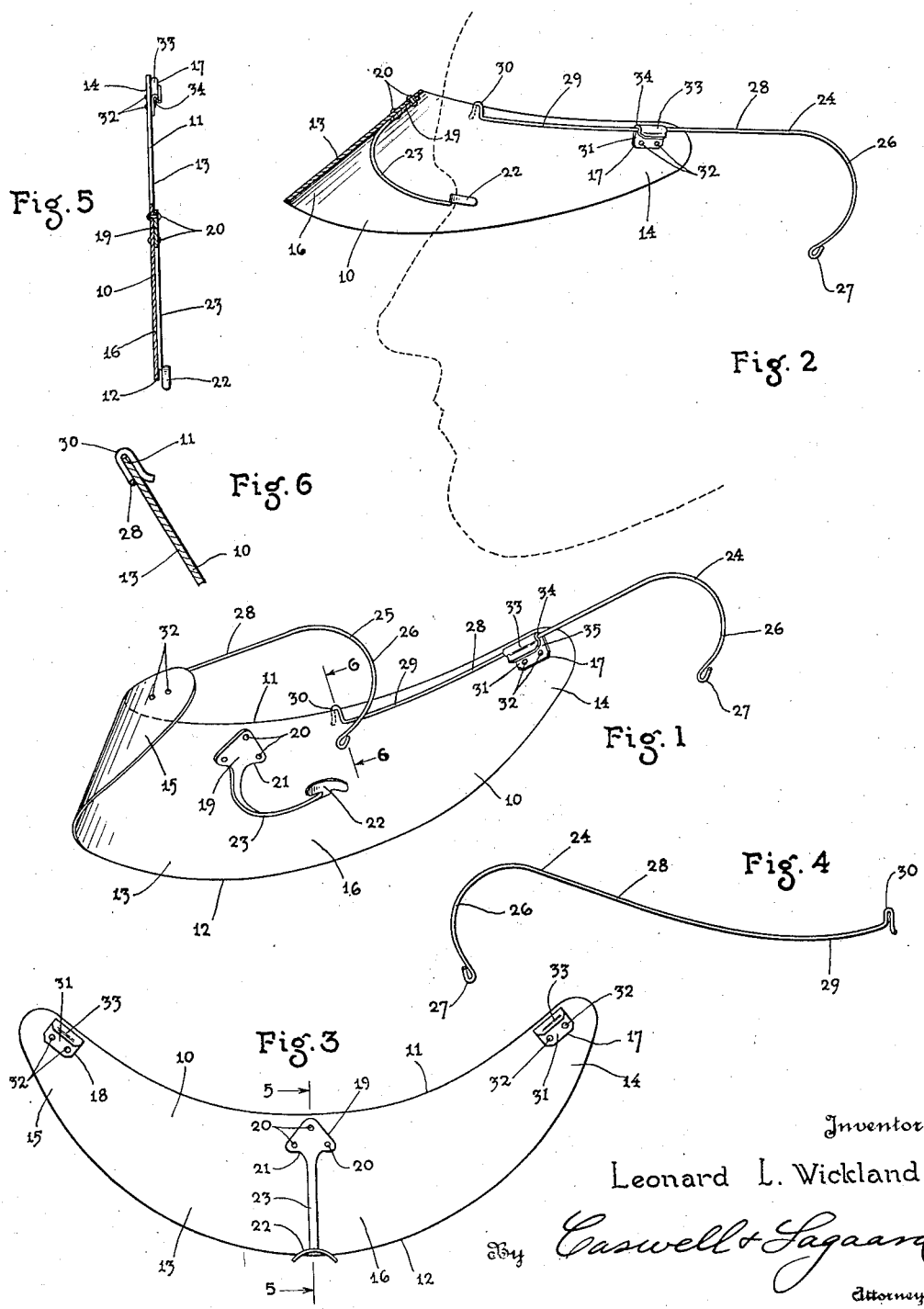
Inventor
Leonard L. Wickland
By Caswell & Sagaard
Attorneys Patented Mar. 26, 1935

1,995,761

UNITED STATES PATENT OFFICE 1,995,761

VISOR

Leonard L. Wickland, Minneapolis, Minn.

Application February 27, 1932, Serial No. 595,589

7 Claims. (Cl. 2—12)

My invention relates to visors and has for its object to provide a visor having an adjustable nose piece whereby the visor may be properly positioned with respect to the head of the user.

Another object of the invention resides in providing a mounting for attachment to the shade and in further providing a flexible arm for connecting the mounting to the nose piece.

A still further object of the invention resides in constructing the mounting, arm and nose piece integral with one another.

A feature of the invention resides in attaching the mounting to the shade near one edge thereof and in causing the arm to normally lie along the surface of the shade with the nose piece substantially in the plane of the shade.

A still further object of the invention resides in constructing the arm relatively narrower than the nose piece and mounting so as to procure flexibility thereof.

An object of the invention resides in constructing the mounting triangular in form and in having the arm for supporting the nose piece issue outwardly from the base of the mounting.

Another object of the invention resides in providing a visor having adjustable temples which may be adjusted to fit the head of the user.

A further object of the invention resides in constructing the shade with mountings at the ends thereof and in slidably attaching the temples in said end mountings.

An object of the invention resides in providing the temples with elongated portions slidable along the end mountings and in further constructing said elongated portions of sufficient length to extend along the shade and reinforce the same.

A still further object of the invention resides in constructing the temples with clips at the ends of the elongated portions adapted to engage the shade proper and to attach the same to the shade.

Another object of the invention resides in constructing said clips U-shaped so as to engage the edge of the shade and to cause the temples to be guided thereby in movement along the end mountings.

A feature of the invention resides in constructing the end mountings open with U-shaped guideways to permit of the insertion of the temples into the same.

A feature of the invention resides in constructing the temples of wire and in forming the said clips so as to restrain rotation of the temples within the guideways formed in said mountings.

Other objects of the invention reside in the novel combination of parts and in the details of construction hereinafter illustrated and described.

In the drawing:

Fig. 1 is a perspective view of a visor illustrating an embodiment of my invention and showing the parts arranged in position for use.

Fig. 2 is an elevational sectional view of the visor taken through the medial plane.

Fig. 3 is a plan view of the shade with the nose piece in normal position and with the bows detached therefrom.

Fig. 4 is a plan view of one of the bows detached from the shade.

Fig. 5 is a sectional view taken on line 5—5 of Fig. 3 and drawn to a larger scale.

Fig. 6 is a sectional view taken on line 6—6 of Fig. 1.

In visors using nose pieces adjustably attached to the shade through pivoted or sliding members some difficulty arises in causing the parts to remain adjusted. Further difficulty is brought about in positively bringing the parts into adjusted position. The present invention overcomes these disadvantages in a manner which will presently become apparent.

My invention proper consists of a shade 10 which may be constructed of celluloid or any other suitable material, such as is well known in the art and is customarily used in the construction of visors. The shade 10 is preferably flexible so that it may be flattened out and placed in a suitable envelope or box or carton of relatively small depth and so that the same may be readily bent when desired for use to conform to the shape and size of the head of the user. The shade 10 is constructed crescent shaped having an upper edge 11 and a lower edge 12, meeting said upper edge and defining a body portion 13 having end portions 14 and 15 and an intermediate portion 16. When the shade is bent into the desired form, the shade extends about the forehead of the user and projects outwardly therefrom in a manner to shade the user's eyes. In such position the upper edge 11 of the shade extends substantially in a single plane and encircles the forehead of the user.

The shade 10 has attached to it medially thereof a nose piece 22 which is constructed and supported as follows: For this purpose a mounting 19 is employed which is attached to the intermediate portion of the shade 10 near the upper edge 11 thereof. Mounting 19 is triangular in shape, being formed with a base portion 21 lying parallel to the edge 11. At the various corners of this mounting are provided rivets 20 which extend through the mounting and through the shade and which serve to hold the mounting attached to the shade proper at the desired locality. Issuing outwardly from the base 21 of mounting 19 is an elongated flexible arm 23 which has attached to it at its free end, the nose piece 22. The mounting 19, arm 23 and nose piece 22 are all preferably stamped from a single sheet of metal and the nose piece is bent, as shown in Fig. 3, to the desired shape so as to fit the nose of the user. The arm 23 is considerably narrower than either the nose piece 22 or the mounting 19, making the same flexible so that it can be readily bent to bring the nose piece in the proper position for use. In the manufacture of the device, the arm 23 is maintained flat and when the mounting 19 is riveted to the shade, is adapted to extend along said shade as shown in detail in Fig. 5. This arm is detached from the shade throughout its length so that when the shade is desired for use the nose piece 22 may be moved outwardly and the arm 23 bent to bring the said nose piece into proper position.

For the purpose of supporting the visor, two temples 24 and 25 are employed which are attached to the visor and which are adapted to engage the ears of the wearer to hold the visor mounted in proper position. These temples being identical in construction, only temple 24 will be described in detail which is illustrated in Fig. 4. This temple comprises a bow 26 preferably terminating in a loop 27 at its end, which bow is adapted to fit over the ear of the wearer. Temple 24 further comprises an elongated portion 28 adapted to fit along the side of the head. This elongated portion is extended as indicated at 29 beyond the point of attachment of the temple to the shade and is adapted to follow along the shade for an appreciable portion of the length thereof and to be attached at its forward end to the shade to form a reinforcement for stiffening the shade. For this purpose the free end of the elongated portion 28 is constructed with a clip 30 bent from the wire from which the temple is constructed, which clip is adapted to fit over the free edge 11 of the shade, and to hold the temple firmly attached thereto. The clip 30 assists in guiding the temple for sliding movement along the shade so that the bow 24 may be adjusted to fit the head of the user.

In addition to the clip 30 for attaching the temple to the shade, mountings 17 and 18 are employed, which mountings are identical in construction. Mounting 17 is provided with a body portion 31 adapted to overlie the end portion 14 of the shade 10, which body portion is riveted to the shade by rivets 32. At the portion of the mounting 17 adjacent the edge 11 of the shade proper is formed a U-shaped guide 33 which provides a guideway 34 adapted to receive the elongated portion 28 of the temple 24. This guideway is provided with an opening 35 through which the elongated portion 28 of the temple may be inserted to bring the same within said guideway. By means of this construction, the temple is detachably supported through the mounting 17 and clip 30 and may be slid along the edge 11 to permit of adjusting the device to fit the ears of the user. Due to the fact that the portion 29 of the temple extends for an appreciable distance beyond the mounting 17, the visor is reinforced thereby and caused to retain a curved form fitting about the head of the user.

The invention is used as follows: When the visor is packed or boxed, the temples are detached from the shade and the arm 23 supporting the nose piece lies flat against the shade as shown in Fig. 5. When desired for use, the temples are attached to the shade by first applying the clips 30 to the free edge 11 of the same. The elongated portions 28 are then forced through the openings 35 of the mountings 17 and 18, and into the guideways 34 where the same become supported for sliding movement. In the construction of the guides 33, the openings 35 are slightly narrower than the diameter of the guideways 34 so that the temples have to be forced into said guideways and so that when the same are in position therein the temples are held from accidental disengagement therefrom. The nose piece 22 is next brought into position. This is accomplished by placing the finger nail under the said nose piece when the same is in position shown in Fig. 5 and in moving the same outwardly. Due to the attachment of the mounting 19 as shown, simple movement of the nose piece brings the same into a position such as shown in Fig. 2 which will be found to be substantially the proper position to support the shade with respect to the head of the user. The two temples 24 and 25 are next moved along the edge 11 of the shade until the bows 26 thereof are in proper position to engage the ears of the user. Further readjustment of both the temples and nose piece can thereafter be made to cause the visor to comfortably fit the user. When the device has been properly assembled the same can be quickly and easily applied in the same manner as an ordinary pair of glasses and when thus supported forms a shade for the eyes excluding the downwardly directed rays of light and at the same time giving clear vision to the user.

By properly bending the arm 23, supporting nose piece 22, the visor can be adjusted so that the edge 11 of shade 13 is free from the forehad of the user throughout its extent, thereby giving greater comfort to the user and particularly in hot weather.

My invention is highly meritorious in that an extremely simple and inexpensive device is provided which has all of the advantages of the majority of visors now in use and many advantages not found in any of them. The nose piece and support therefor being constructed integrally, the nose piece remains in adjusted position, there being no parts to be lost or to become loosened after use. The arm connecting the nose piece being flexible the nose piece is quickly and readily brought to the proper position. When the nose piece is properly positioned, the arm connecting the nose piece to the mounting is so disposed as to not obscure the vision of the user. The device may be employed with glasses in which the bridge is raised above the socket of the nose without removal of the glasses, since the arm 23 connecting the nose extends directly outwardly from the head of the user. With the adjustable temples the visor can be accurately fitted to the head of the user so as to function in the intended manner. By constructing both the nose piece and temples adjustable, a single visor is suitable for use with any desired shape or size of head, thereby permitting the manufacture of a single visor for universal use. The parts are readily assembled or taken apart as required and the arm connecting the nose piece to the mounting being constructed of flexible material, the same may be bent a great many times before breaking.

Changes in the specific form of my invention, as herein disclosed, may be made within the scope of what is claimed without departing from the spirit of my invention.

Having described my invention, what I claim as new and desire to protect by Letters Patent is:

1. A visor comprising a shade, a mounting attached to one end of said shade, a temple movable along said mounting and a member forming an integral part of said temple and movable with respect to the shade and disposed at another locality thereof for reinforcing the shade.

2. A visor comprising a shade, a mounting at one end of said shade, a guideway formed in said mounting, a temple having an elongated portion slidable along said guideway, said portion extending beyond said mounting, and means on the end of said elongated portion slidably engaging the shade at another locality thereon, said temple reinforcing the shade.

3. A visor comprising a shade, a temple having an elongated portion extending along one of the edges thereof, a clip formed on the free end of the elongated portion of the temple for engagement with the shade intermediate the ends thereof, and means at the end of the shade for further engagement with the temple.

4. A visor comprising a shade, a temple having an elongated portion extending along one of the edges thereof, means at one end of the elongated portion of said temple for engagement with the shade intermediate the ends thereof, and means at one end of the shade for engagement with said temple intermediate the ends thereof.

5. A visor comprising a shade having a free edge, a temple having an elongated portion, means on said shade for supporting the elongated portion for movement along the edge of the shade and a U-shaped clip formed on the end of said temple and straddling said shade, said temple being further guided for movement along the edge of the shade through said U-shaped clip.

6. A visor comprising a shade, a temple having an elongated portion following along an edge of the shade for reinforcing the same, a guide at the end of the shade for guiding said temple for sliding movement along the edge of the shade, and a second guide intermediate the ends of the shade for similarly guiding the elongated portion of the shade for sliding movement.

7. A visor comprising a shade adapted to extend angularly from the forehead of the wearer, a mounting attached to said shade at the upper portion thereof, an arm issuing from said mounting, said arm having a part adjacent the mounting extending downwardly, and a part connected therewith and extending in a horizontal direction and toward the nose of the wearer, a nose piece connected to said last named part, said last named part issuing from the lowermost portion of the nose piece and being substantially at right angles to said nose piece.

LEONARD L. WICKLAND.